July 8, 1969        F. W. FORK        3,453,791
UNDERFLOOR ELECTRICAL RACEWAY CROSSOVER UNIT
Filed Oct. 18, 1967
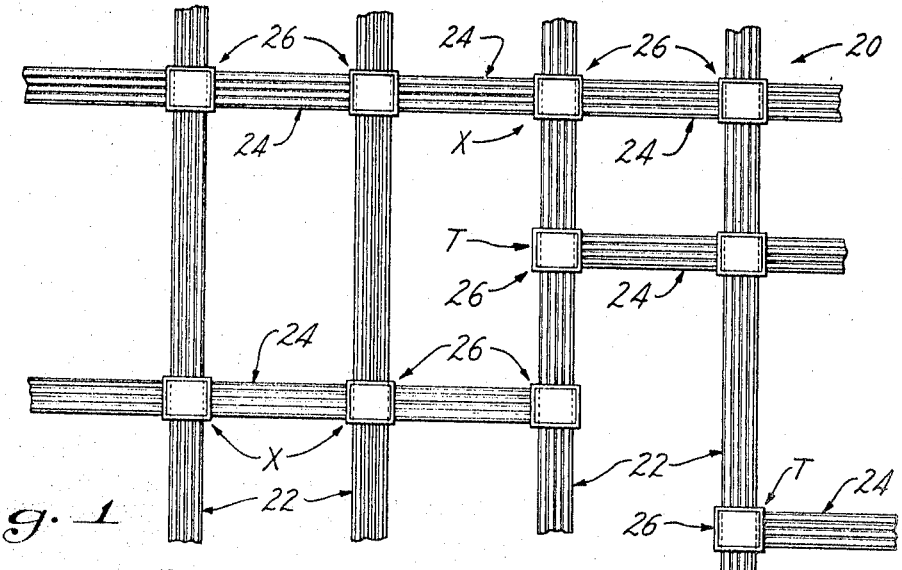
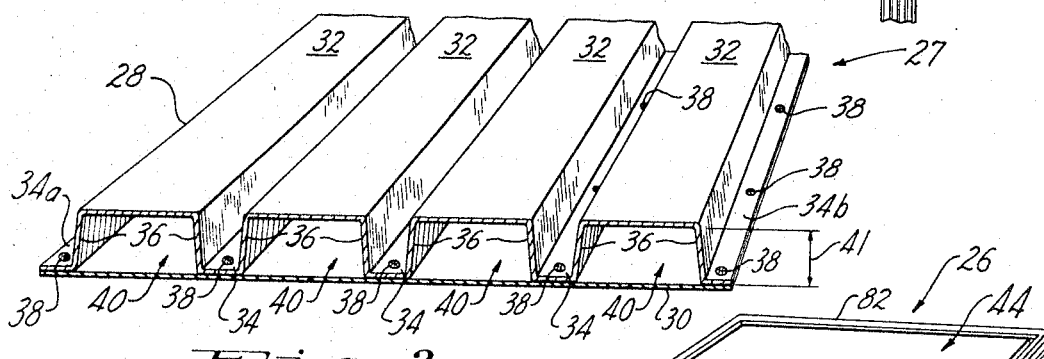
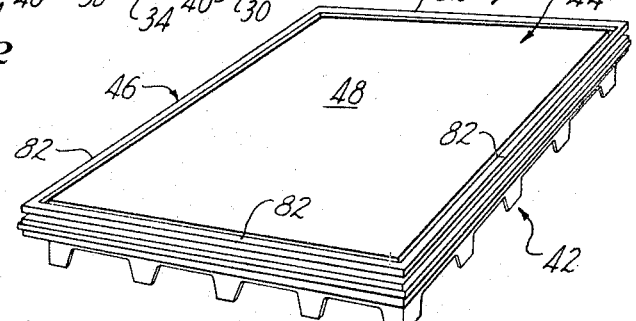
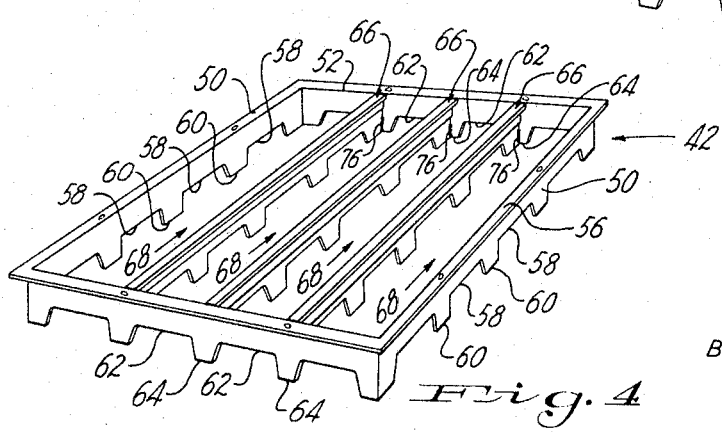
INVENTOR
FRANK W. FORK
BY *George E. Manias*
AGENT

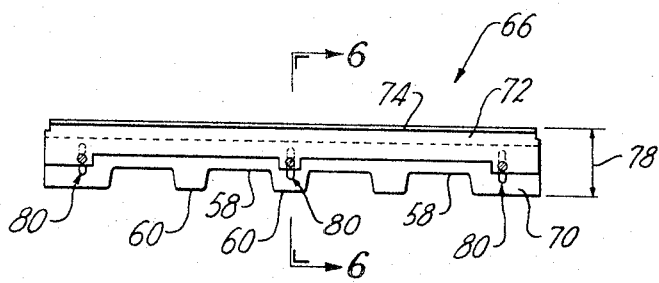
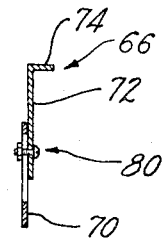
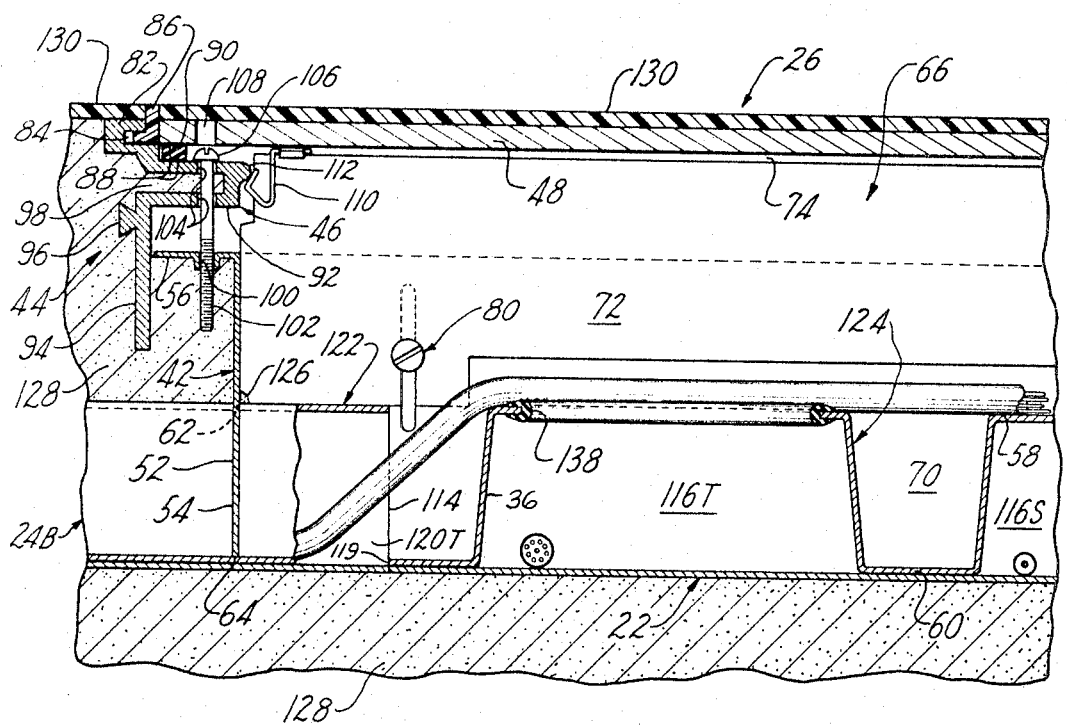

INVENTOR
FRANK W. FORK
AGENT

United States Patent Office 3,453,791
Patented July 8, 1969

3,453,791
UNDERFLOOR ELECTRICAL RACEWAY CROSSOVER UNIT
Frank W. Fork, Allison Park, Pa., assignor to H. H. Robertson Company, Pittsburgh, Pa., a corporation of Pennsylvania
Filed Oct. 18, 1967, Ser. No. 676,218
Int. Cl. E04b 5/48; H02g 3/28
U.S. Cl. 52—221                              10 Claims

ABSTRACT OF THE DISCLOSURE

A wiring distribution arrangement for a building floor including a main electrical header and laterally extending cellular feeder raceways disposed at the same level as the header. A crossover unit is provided which surrounds the region of intersection of the header and the feeder raceways. The crossover unit is partitioned to allow wiring to extend through the header into the crossover unit and thence into the cellular feeder raceways.

BACKGROUND OF THE INVENTION

Field of the invention

The invention relates to electrical wiring distributing apparatus, and more particularly to an underfloor electrical raceway crossover unit for use at the intersection of main and feeder cellular raceway units which lie at a common level.

Description of the prior art

It is a common practice to embed duct elements in a modern reinforced concrete floor construction for distributing electrical wiring throughout the floor area. The duct elements may comprise a single conduit or a metal cellular flooring which presents a plurality of enclosed cells. To distribute the electrical wiring throughout the floor area it is necessary that a first group of duct elements extend in one direction of the floor and that a second group of the duct elements extend laterally of the first group. Some means for crossing over or crossing under must be provided at those points where a duct element of one group intersects a duct element of the other group.

In the prior art two level arrangement, a first group of duct elements is positioned at one level above or below the second group of duct elements which are positioned at another level. In many instances it is undesirable, and in some instances it is impossible, to use this two level arrangement because the depth of the floor becomes excessive.

In another arrangement, all of the duct elements of each group are placed at the same common level. At the points of intersection between the duct elements, cross-under and crossover duct segments are incorporated into the duct elements of one group such that these duct elements pass around the duct elements of the other group. Examples of a crossunder arrangement will be found in U.S. Patents 1,530,200 and 1,782,779. These arrangements have the same disadvantage as the two level system described above.

Another commonly used method is to insert junction boxes in the system at the points where the duct elements intersect. While junction boxes are primarily intended and utilized for channeling the wiring, changing its direction, etc., they can also be utilized as a means whereby a first conduit disposed at an angle to a second conduit can traverse the second conduit. However, a junction box is expensive and the use of junction boxes substantially increases the cost of the construction. An example of underfloor wiring duct systems employing junction boxes will be found in U.S. Patents 1,626,570; 1,893,268; and Reissue Patent 17,290.

SUMMARY OF THE INVENTION

The principal object of the present invention is to provide an improved raceway crossover unit for use at the intersection of main and feeder cellular raceway units lying at a common level.

Another object of the present invention is to provide a crossover unit which does not necessitate an increase in the finished floor thickness.

A further object of the present invention is to provide a crossover unit which provides access to wiring in the subjacent raceway units from the floor level.

Still another object of the present invention is to provide an improved raceway crossover unit incorporating vertically adjustable cover means such that the cover means may be positioned flush with the intended level of the finished floor.

A further object of the invention is to provide an electrical crossover unit wherein the wiring of various electrical services is entirely segregated according to its type.

The present invention provides a crossover unit for use in conjunction with an underfloor electrical wiring distributing system. The distributing system includes at least one main cellular raceway unit and at least one feeder cellular raceway unit which lie at a common level. The main cellular raceway unit extends uninterruptedly in one direction throughout the length of the floor and presents a plurality of generally parallel, spaced-apart, enclosed main cells. The feeder cellular raceway unit also presents a plurality of generally parallel, spaced-apart, enclosed feeder cells which terminate in open feeder cell ends positioned adjacent to one of the longitudinal side edges of the main cellular raceway unit. The system may include a second feeder cellular raceway unit positioned on the opposite side of the main cellular raceway unit and presenting a plurality of generally parallel, spaced-apart, enclosed feeder cells.

In accordance with the present invention, the crossover unit comprises frame means forming a boundary enclosing end portions of the feeder cellular raceway units and that portion of the main cellular raceway unit between the aforesaid feeder cell end portions. Partitioning means carried by the frame means extend transversely of the main cellular raceway unit and divide the interior of the frame means into passageways providing communication between corresponding feeder cells of the feeder cellular raceway units above the main cellular raceway unit. The main cells have access openings each providing communication between one of the main cells and one of the passageways. The crossover unit includes cover means which overlie the frame means.

In accordance with the present invention, the crossover unit provides continuity of wiring passage between corresponding feeder cells and/or continuity of wiring passage from a particular feeder cell to a main cell conveying corresponding type of electrical wiring.

BRIEF DESCRIPTION OF THE DRAWINGS

FIGURE 1 is a plan view of an electrical wiring distributing system incorporating electrical raceway crossover units of the present invention;

FIGURE 2 is a fragmentary perspective view of a typical cellular raceway unit;

FIGURE 3 is a perspective view of the present electrical raceway crossover unit;

FIGURE 4 is a perspective view of frame means used in the present electrical raceway crossover unit;

FIGURE 5 is a side view of partitioning means employed in the present electrical raceway crossover unit;

FIGURE 6 is a cross-sectional view taken along the line 6—6 of FIGURE 5;

FIGURE 7 is a fragmentary cross-sectional view, on an enlarged scale, taken along the line 7—7 of FIGURE 8 and illustrating the present electrical raceway crossover unit installed in a concrete floor construction;

DESCRIPTION OF THE PREFERRED EMBODIMENT(S)

Figure 8:
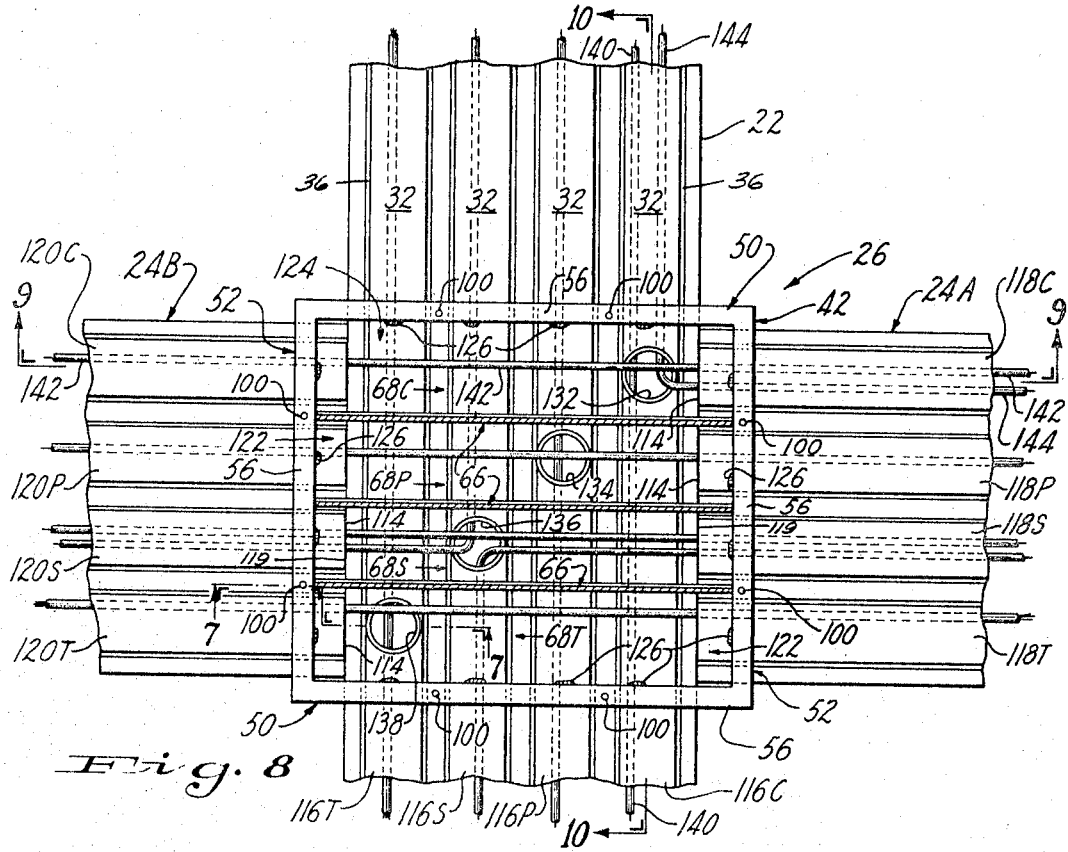
FIGURE 8 is a fragmentary plan view of the present frame means installed at the intersection of main and feeder cellular raceway units.

*Electrical wiring distributing system.*—Referring now to FIGURE 1, there is illustrated an electrical wiring distributing system 20 comprising a plurality of spaced-apart, generally parallel, main cellular raceway units 22, spaced-apart, generally parallel, feeder celluar raceway units 24, and crossover units 26 of the present invention. The main cellular raceway units 22 extend uninterruptedly in one direction whereas the feeder cellular raceway units 24 extend between and terminate at adjacent ones of the main cellular raceway units 22. The main cellular raceway units 22 and the feeder cellular raceway units 24 lie in a common plane.

As will become apparent, the overall arrangement of the electrical wiring distributing system 20 is such that electrical wiring of various electrical services, such as telephone, power, signal and communications, may extend uninterruptedly through the main cellular raceway units 22; other electrical wiring may extend uninterruptedly through the feeder cellular raceway units 24 and the intervening crossover units 26 of the invention; and the wiring of any particular electrical service may extend from a main cellular raceway unit 22 into that cell of the feeder cellular raceway units which conveys the corresponding electrical service. The electrical wiring of each electrical service is completely segregated from the wiring of the other electrical services regardless of which direction that electrical wiring extends through the distributing system 20.

The present crossover unit 26 may be used at an X intersection wherein two feeder cellular raceway units 24 intersect a main cellular raceway unit 22. The present crossover unit 26 may also be used at a T intersection wherein one feeder cellular raceway unit 24 intersects a main cellular raceway unit 22.

*Typical cellular raceway unit.*—Referring now to FIGURE 2 there is illustrated a typical cellular raceway unit 27 which may be used as the main cellular raceway unit 22 and as the feeder cellular raceway unit 24. The cellular raceway unit 27 may comprise that cellular raceway unit described and illustrated in my copending application Serial No. 625,755, filed Mar. 24, 1967 and assigned to the assignee of the present invention. Reference is directed to the aforesaid pending application Ser. No. 625,755 for a complete description of the unit and a method for making the same.

For the purposes of the present invention it is believed sufficient to state that the cellular raceway unit 27 comprises an upper metal sheet 28 and a lower metal sheet 30. The upper metal sheet 28 is corrugated and includes spaced crests 32, intervening valleys 34 and generally vertical webs 36 connecting crests 32 and the adjacent valleys 34. The upper metal sheet 28 also includes side valleys 34a and 34b. The lower metal sheet 40 has a flat rectangular configuration and is secured to the valleys 34, 34a and 34b of the upper metal sheet 28 preferably by means of a plurality of spot welds 38. The lower metal sheet 24 cooperates with the crests 32 and the generally vertical webs 36 to form a plurality of spaced-apart, generally parallel, enclosed cells 40.

It should be understood at this time that the cellular raceway unit 27 of FIGURE 2 is included merely to illustrate one common configuration of a typical raceway unit. The height of the unit 27 as indicated at 41 and the cross-sectional area and the number of enclosed cells 40 may be varied to suit requirements.

In the wiring distributing system 20 of FIGURE 1, the cellular raceway units 22 and 24 may have different heights if desired.

*Present electrical crossover unit.*—Referring now to FIGURE 3, the present electrical raceway crossover unit 26 comprises, in general, first frame means 42 adapted to overlie in mating engagement with the main and feeder cellular raceway units, and cover means 44 comprising second frame means 46 overlying the first frame means 42 and a cover plate 48.

*First frame means 42.*—As can best be seen in FIGURE 4, the first frame means 42 has a generally rectangular configuration and is open at its top and bottom. The first frame means 42 includes first opposed sidewalls 50 and second opposed sidewalls 52 which are connected together to present a continuous generally vertical peripheral wall 54 and a continuous horizontal, outwardly extending flange or ledge 56 adapted to support the cover means 44. The first and second opposed sidewalls, 50, 52 may be formed from zinc coated steel having a thickness in the range from 12 to 26 gauge.

Each of the first opposed sidewalls 50 has a corrugated bottom edge including inverted U-shaped recesses 58 and coplanar bottom surfaces 60. The corrugated bottom edge configuration of the first opposed sidewalls 50 corresponds to the transverse profile of the main cellular raceway units 22 (FIGURE 1).

Each of the second opposed sidewalls 52 has a corrugated bottom edge including inverted U-shaped recesses 62 and coplanar surfaces 64. The corrugated bottom edge configuration of the second opposed sidewalls corresponds to the transverse profile of a feeder cellular raceway unit 24 (FIGURE 1).

The first frame means 42 is provided with partitioning means 66 which extend between the second opposed sidewalls 52 and are spaced from each other and from the first opposed sidewalls 50. The partitioning means 66 cooperate with the cover means 44 and a main cellular raceway unit 22 (FIGURE 1). to define a plurality of passageways 68.

Referring now to FIGURES 5 and 6, the partitioning means 66 comprises two-piece divider strips including a first metal strip 70 and a second metal strip 72 provided with a flange 74. The strips 70, 72 may be formed from zinc coated steel having a thickness in the range from 12 to 26 gauge.

The first metal strip 70 has a corrugated bottom edge including inverted U-shaped recesses 58 and coplanar bottom surfaces 60 which correspond to the recesses 58 and surfaces 60 of the first opposed sidewalls 50. The ends of the first metal strip 70 are secured to the second opposed sidewalls 52 as by means of spot welds 76 shown in FIGURE 4. The first metal strip 70 is positioned within the first frame means 42 such that the surfaces 60 thereof are substantially coplanar with the surfaces 60 of the first opposed sidewalls 50.

The second metal strip 72 is slideable relative to the first metal strip 70 to adjust the height 78 of the partitioning means 66 to correspond with the height of the crossover unit 26. Suitable slot-and-fastener means 80 is provided for securing the second metal strip 70 to the first metal strip 70 in adjusted position.

*Second frame means 46.*—Referring now to FIGURE 3, the second frame means 46 has a generally rectangular configuration including side rails 82 adapted to overlie the first and second opposed sidewalls of the first frame means 42.

Referring now to FIGURE 7, the side rails 82 are generally similar to that side rail described and illustrated in copending application Serial No. 644,014, filed June 6, 1967 and assigned to the assignee of the present invention. Each side rail 82 includes a channel 84 for receiving a reversible tile stop 86; a shoulder 88 for receiving a strip gasket 90; a rail 92; a depending skirt 94; and preferably one or more concrete anchor appendages 96. While the rail 92 may be solid, it is preferred that the rail 92 include an outwardly opening channel 98. The side rail 82 preferably is formed from aluminum alloy by extrusion processes to the desired profile. The side rails 82 may be connected by mitered joints to form the second frame means 46.

The outwardly extending flange 56 of the first and second opposed sidewalls 50, 52 as shown in FIGURES 7 and 8, is provided with spaced threaded apertures 100 for threadedly receiving elevating screws 102, (one shown in FIGURE 7) which extend through clearance openings 104 in the rail 92 and which have an enlarged head 106. The cover plate 48 is provided with clearance access openings 108 which are smaller in diameter than the enlarged head 106 and through which a screw-turning implement, such as a screw driver tip, can be inserted for turning the elevating screws 102 and thereby adjust the height of the cover means 44 relative to the first frame means 42.

The cover plate 48 is detachably connected to the second frame means 46 by a plurality of spring clips 110 which are themselves detachably connected to the cover plate 48. The spring clips 110 engage an inwardly presented bead 112 which is extruded directly as an integral element of the side rail 82. It will be understood that the beads 112 of, for example, the first opposed sidewalls 50, present opposed surfaces which are resiliently engaged by the spring clips 110.

*Installation of crossover unit 26.*—The present crossover unit 26 is installed at the intersection of a main cellular raceway unit 22 and at least one feeder cellular raceway unit 24, a description of which will now follow with reference to FIGURES 7–10, inclusive.

Referring in particular to FIGURES 7 and 8, it will be seen that the main and feeder cellular raceway units 24 lie at a common level. The feeder cellular raceway units 24 terminate in open feeder cell ends 114 disposed adjacent to the opposite longitudinal side edges 119 and spaced-apart from the longitudinal side walls 36 of the main cellular raceway unit 22. As illustrated, the main cellular raceway unit 22 presents four main cells 116, the feeder cellular raceway unit 24A presents four feeder cells 118, and the second feeder cellular raceway unit 24B presents four feeder cells 120. The cells of the main and feeder cellular raceway units 22, 24A and 24B are adapted to convey wiring of different electrical services, for example, telephone, signal, power and communications. The letters T, S, P and C have been added to the cell designations 116, 118 and 120 to indicate the type of electrical service conveyed by that particular cell.

In the preferred arrangement, the feeder cellular raceway units 24A and 24B are aligned in cell-to-cell correspondence and abut the longitudinal side edges of the main cellular raceway unit. The number of main cells 116 is normally equal to the number of feeder cells 118, 120.

The present crossover unit 126 encloses feeder cell end portions 122 of the feeder cellular raceway units 24A and 24B and a main cellular raceway portion 124 (including segments of the main cells 116) residing between the feeder cell end portions 122. The feeder cell end portions 122 and the main cellular raceway portion 124 are enclosed within a common boundary defined by the first frame means 42. As can best be seen in FIGURE 7, the inverted U-shaped recesses 58 and the coplanar bottom surfaces 60 adapt the first opposed sidewalls 50 and the partitioning means 66 for mating engagement with the upper surface of the main cellular raceway unit 22; and the inverted U-shaped recesses 62 and the coplanar bottom surfaces 64 adapt the second opposed sidewalls 52 for mating engagement with the upper surface of the feeder cellular raceway units 24A, 24B.

The first frame means 42 may be secured to the main and feeder cellular raceway units 22, 24A, 24B by a series of tack welds 126 shown in FIGURES 7 and 8.

As shown in FIGURE 7, the main and feeder cellular raceway units are embedded in concrete 128 while the crossover unit 26 of the present invention is surrounded by the concrete 128 and has its cover plate 48 positioned at the level of the finished floor. Normally, a decorative coating 130 is provided above the concrete 128 and the cover plate 48, for example, linoleum, asphalt tile, rubber tile, ceramic tile, carpeting and the like.

Figure 9:
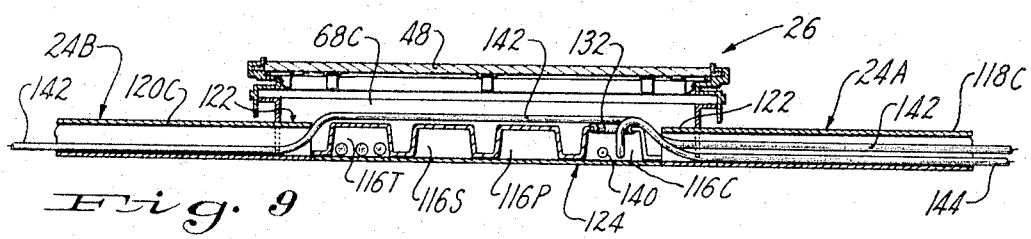
FIGURE 9 is a cross-sectional view taken along the line 9—9 of FIGURE 8.
Figure 10:
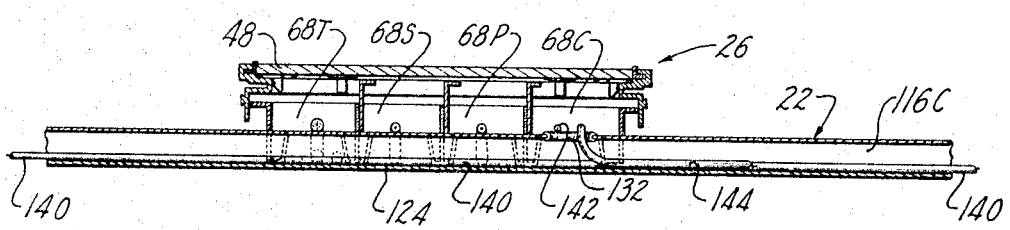
FIGURE 10 is a cross-sectional view taken along the line 10—10 of FIGURE 8.

Referring now to FIGURES 8, 9 and 10, grommeted openings 132, 134, 136 and 138 are provided in the crests 32 of the main cells 116C, 116P, 116S, and 116T. The grommeted openings 132, 134, 136, 138 reside, one each in the passageways 68 defined by the first frame means 42 and the partitioning means 66. The overall arrangement is such that, for example, the grommeted opening 132 provides direct communication between the main cell 116C and the passageway 68C which in turn communicates with corresponding feeder cells 118C, 120C. Similarly, the grommeted openings 134, 136 and 138 provide direct communication between the main cells 116P, 116S, 116T, respectively, and the passageways 68P, 68S and 68T—these passageways communicating with corresponding feeder cells 118P, 120P; 118S, 120S; and 118T, 120T, respectively.

For example, as shown in FIGURES 8 and 10, a first communication wiring 140 may extend uninterruptedly through the main cell 116C beneath the crossover unit 26. As shown in FIGURES 8 and 9, a second communication wiring 142 may extend uninterruptedly through the feeder cell 118C of the feeder cellular raceway unit 24A, over the main cellular raceway portion 124 through the passageway 68C and thence through the corresponding feeder cell 120C of the feeder cellular raceway unit 24B. Finally, as shown in FIGURES 8, 9 and 10, a third communication wiring 144 may extend through the main cell 116C of the main cellular raceway unit 22, up through the grommeted opening 132 into the passageway 68C and thence, for example, through the feeder cell 118C of the feeder cellular raceway unit 24A.

It should now be readily apparent that by removing the cover plate 48, access may be gained to the various electrical services for the purpose of redistributing the wiring, adding additional wiring and the like as required by changes in the electrical requirements. The overall thickness of the finished concrete floor is not increased by the addition of the present crossover unit. Furthermore, the various electrical services are entirely segregated from one another such that the distribution of one electrical service does not interfere with the distribution of the other electrical services.

I claim:

1. An electrical distribution system for a building floor including:
   an integral uninterrupted main unit having plural, generally parallel uninterrupted main wiring passageways;
   at least one integral feeder unit having plural, generally parallel feeder wiring passageways terminating in open feeder wiring passageway ends spaced from said main wiring passageways of the said main unit and extending laterally therefrom;
   said main unit and said feeder unit lying at a common level;
   a housing above said main unit, having plural parallel compartments extending across said main unit, said housing enclosing a segment of said main unit and an end portion of said feeder unit; and
   at least one of said main wiring passageways having an access opening within said housing, providing communication from the interior of the said one of said main wiring passageways through said access opening into one of said compartments of said housing above said main unit to one of said open feeder wiring passageway ends of said end portion of said feeder unit.

2. In an electrical wiring distributing apparatus, the combination comprising:
an uninterrupted main cellular raceway unit having a plurality of generally parallel, enclosed main cells and opposite longitudinal side edges;
laterally extending feeder cellular raceway units, one on each side of said main cellular raceway unit and each having a plurality of generally parallel, enclosed feeder cells, said feeder cellular raceway unit terminating in open feeder cell ends adjacent to one of said opposite longitudinal side edges of said main cellular raceway unit;
said main cellular raceway unit and said feeder cellular raceway units lying at a common level;
frame means forming a boundary enclosing end portions of said feeder cellular raceway units and that segment of said main cellular raceway unit between said end portions;
partitioning means extending transversely of said segment for dividing the interior of said frame means into passageways providing communication between said feeder cells of said feeder cellular raceway units above said segment;
said main cells having access openings each providing communication between one of said main cells and one of said passageways; and
cover means for said frame means.

3. The combination of claim 2 wherein said feeder cellular raceway units are aligned in cell-to-cell correspondence.

4. The combination defined in claim 2 wherein said main cells and said feeder cells are equal in number.

5. The combination defined in claim 2 wherein said feeder cellular raceway units abut said longitudinal side of said main cellular raceway unit.

6. The combination defined in claim 2 wherein:
said frame means has a generally rectangular configuration including first opposed sidewalls extending across said main cellular raceway unit, and second opposed sidewalls each extending across one of said feeder cellular raceway units; and wherein
said partitioning means comprises divider strips extending between said second opposed sidewalls intermediate of corresponding feeder cells of said feeder cellular raceway units.

7. In electrical wiring distributing apparatus, the combination comprising:
an uninterrupted main cellular raceway unit having a plurality of generally parallel, enclosed main cells and opposite longitudinal side edges;
a feeder cellular raceway unit having a plurality of generally parallel, enclosed feeder cells, said feeder cellular raceway unit terminating in open feeder cell ends adjacent to one of said longitudinal side edges of said main cellular raceway unit and extending laterally away therefrom;
said main cellular raceway unit and said feeder cellular raceway unit lying at a common level;
frame means for enclosing said open feeder cell ends and a main cellular raceway portion which includes segments of all of said main cells;
partitioning means extending across said main cellular raceway portion in covering engagement therewith for dividing the interior of said frame means into passageways providing communication between said feeder cells and the space above said main cellular raceway portion;
said main cells having access openings each providing communication between one of said main cells and one of said passageways; and
removable cover means overlying said frame means for covering the same.

8. The electrical wiring distributing apparatus defined in claim 7 wherein said cover means comprises:
second frame means overlying the first said frame means;
means connecting said second frame means to the first said frame means for vertical adjustment of said second frame means relative to the first said frame means; and
a removable cover plate supported by said second frame means.

9. An electrical distribution system for a building floor including:
an uninterrupted main unit having plural, generally parallel, uninterrupted, main cells and opposite longitudinal side edges;
laterally extending feeder units, one on each side of said main unit and each having a plurality of generally parallel, feeder cells, each of said feeder units terminating in open feeder cell ends adjacent to one of said opposite longitudinal side edges of said main unit;
said main unit and said feeder unit lying at a common level; and
a housing above said main unit, enclosing end portions of said feeder units and that segment of said main unit between said end portions, said housing having partitions extending across the said main unit and providing communication between said feeder cells of said laterally extending feeder units above said segment of said main cell.

10. The electrical distribution system of claim 9 wherein the said main cells of said main unit include crests and imperforate longitudinal side walls.

References Cited

UNITED STATES PATENTS

| Re. 17,290 | 5/1929 | Ashley | 52—221 |
| 2,002,068 | 5/1935 | Walker | 52—221 |
| 1,626,570 | 4/1927 | Walker | 52—221 X |
| 1,815,447 | 7/1931 | Richardson | 52—221 |
| 2,073,490 | 3/1937 | Lewin | 52—221 |
| 2,930,504 | 3/1960 | Hudson | 220—3.4 |
| 3,061,663 | 10/1962 | Reiland | 174—49 |

FOREIGN PATENTS 659,866    3/1963    Canada.

ALFRED C. PERHAM, *Primary Examiner.*

U.S. Cl. X.R.

52—126; 174—49; 220—3.4